May 5, 1931.  R. N. STEELE  1,803,362

ENGINE PISTON

Original Filed July 12, 1928

Inventor
Ray N. Steele
By J. M. St. John
Attorney

Patented May 5, 1931

1,803,362

UNITED STATES PATENT OFFICE

RAY N. STEELE, OF CEDAR RAPIDS, IOWA

ENGINE PISTON

Application filed July 12, 1928, Serial No. 292,196. Renewed May 21, 1930.

This invention relates to the pistons of internal combustion engines, more particularly those used for automobiles and other motor vehicles.

The object of the invention is to produce a light but durable piston.

A further object is to so construct the piston as to avoid distortion of the same by reasons of changes in temperature.

Another object is to simplify the piston and reduce cost of manufacture.

A still further object is to provide means for compensating for unequal expansion and contraction under changes in temperature of the various elements of the piston having differing coefficients of expansion.

The invention is fully set forth in the description and claims following, reference being had to the accompanying drawings, in which:—

Figure 1:
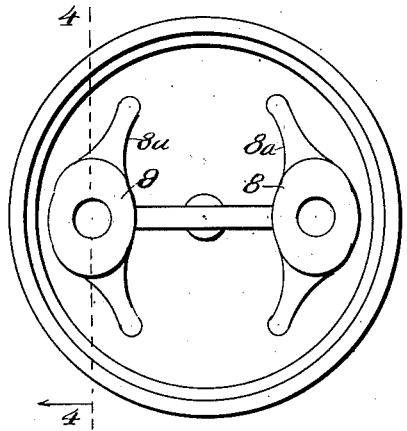
Figure 4:
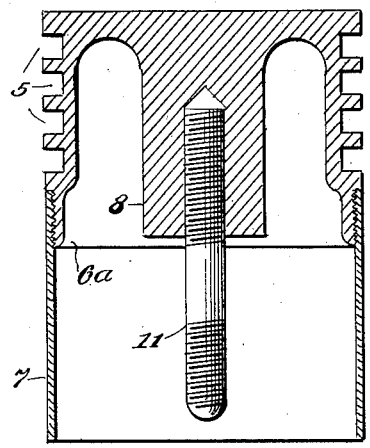
Figures 2, 3:
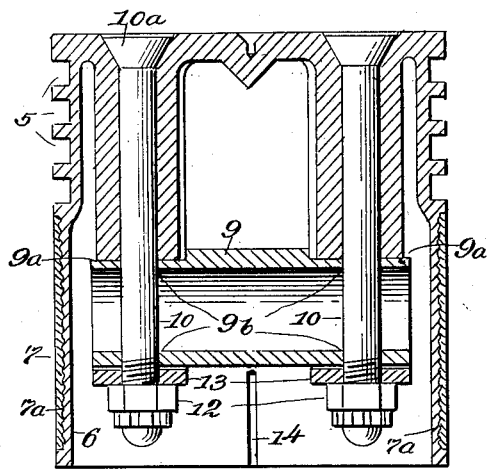

Fig. 1 is a plan view of the cast portion of the piston, as seen from the open end. Fig. 2 is a central section of the assembled piston in a plane longitudinal to the wrist-pin. Fig. 3 is a similar section in a plane transverse to that of Fig. 1. Fig. 4 is a similar section in the plane of the line 4—4 of Fig. 1, looking toward the left.

The main body of the piston, hereafter designated as the head, is a casting of a light metal, such as aluminum, and has the usual seats 5 for rings, not shown. In Fig. 2 the head is shown with an extended tubular portion 6, which may be designated as the inner skirt in distinction from the skirt proper, 7, both to be more fully described hereafter. From the closed end of the head spring two internal posts 8, suitably braced by lateral ribs 8a. These posts serve as the sole supports for the wrist-pin 9, and are the only internal parts of the casting requiring lathe work, or careful fitting of any sort. The posts may be faced while the piston head is mounted in the lathe for outside machining, and with perfect accuracy and exact perpendicularity to its outer walls in a moment.

The wrist-pin is of the usual tubular type, made of steel and finished by hardening and grinding. At one side a space at 9a near each end is flattened, and perpendicular to the flat faces is bored at 9b for the fastening bolts 10 or studs 11. These are provided with the usual castellated nuts 12, and between them and the cylindrical outer faces of the pin are interposed channeled washers or clamp-plates 13. The wings of these clamp-plates impinge on the cylindrical sides of the pin, as clearly shown in Fig. 3. This contact of the wings, when the nuts are drawn up tightly, holds the pin immovably in place, even when there is a gap between the middle part of the clamp and the pin. By using stiff, but slightly elastic steel for the clamp-plates, and fitting them so as to leave this gap normally, the plates may yield a little under the excess expansion of the posts, and the pin be still held firmly in place when by the cooling of the piston the posts contract.

Further compensation for the difference in expansion between the bolts and the posts is provided by forming the bolts with conical heads 10a. As the metal of the head expands in all directions under heat, the lateral expansion around the bolt-heads allows for a little end-slip of the heads in their conical seats, both under high and under low temperatures, and this tends to maintain a stable degree of tightness in the fastening of the pin.

It will of course be understood that there is comparatively little end-strain on the bolts and their fastenings, since the power thrust on the piston is in the opposite direction, forcing the pin against the supporting posts.

It is to be noted that the posts are entirely detached from the side walls of the piston, and thereby distortion of such walls by excess of heat is largely, if not entirely eliminated.

The aluminum of the head is not only very light, which is highly desirable in pistons of the increasingly higher speed automobile engines, but it is also an excellent conductor of heat. In practice it is desirable to dissipate the heat of explosion away from the top of the piston as much and as rapidly as possible, since an excess of heat at this point may result in pre-ignition. This is the main reason for extending the inner skirt 6, as shown in Fig. 2 rather than leaving it short, as shown at 6a in Fig. 4. The bolts of Fig. 2 also are preferred to the studs 11 of Fig. 4, though the use of such studs, and the short skirt, is contemplated, if desired.

In the practical formation of the piston shown in Figs. 2 and 3, the head and its extended skirt are to be cast inside the outer skirt, which is a tube or ring of steel. For this ring a steel of very slight variability under widely variant temperatures, is ideal for the purpose, since it permits a close fitting of the piston to the cylinder initially, and all the disadvantages of a piston, loose under low temperatures, and tight under a high temperature, are avoided. A standard steel of this character is well known under the trade name of "In-var" steel. The head being cast into a ring of such steel, and all in a steel mold, the formation of the piston as a whole is exceedingly simple and inexpensive.

It is not overlooked that in so casting the head the highly expanding aluminum will shrink away from the outer ring when cool, and looseness will result. The remedy for this is to stretch the inner skirt until it fits tightly in the outer one, by pressing, peening, or rolling the two parts together. The expansion and contraction of the inner skirt, in service thereafter is provided for by slitting the inner skirt, as shown at 14, when the spring of the metal compensates for the variations due to temperature.

In this construction it is to be noted that the tightness of the inner skirt to the outer one need not necessarily extend the full length of the skirts. To prevent rattle they should be tight somewhere along their length, preferably at the lower end, where the spring of the inner skirt is most available, but above that a trifling looseness can do no harm. So also a corrugation of the outer skirt inside at 7a tends to lock the skirts into close contact and prevent any slippage of either with respect to the other.

The construction gives to the piston a broad, unbroken wearing surface of this steel, a light head to carry the rings, and a skirt of the same high conductivity as the rest of the head to transmit heat away from the top of the piston.

Having thus described my invention, I claim:—

1. In an engine piston, an improved mounting for the wrist-pin, comprising a pair of posts springing from the closed end of the piston, bolts therein, a wrist-pin flattened at the ends on one side to rest on the posts, and bored for said bolts, clamping nuts, and channeled clamp-plates interposed between the nuts and the cylindrical side of the pin.

2. In an engine piston, an improved mounting for the wrist-pin, comprising a pair of posts springing from the closed end of the head and wholly detached from the side walls, bolts in said posts, a wrist-pin flattened at the ends on one side to rest on said posts, clamping nuts, and channeled clamps of slightly elastic material interposed between said nuts and the cylindrical side of the pin.

3. A piston having posts within the piston skirt, wholly detached therefrom, and integral with the head, said posts having their free ends flattened and having bolts projecting from the flat faces for the attachment of a wrist pin, and a wrist pin having flat faces to cooperate with the flat faces of the posts, said wrist pin being apertured for mounting upon the bolts and being secured in place thereon.

4. A piston having posts within the piston skirt, wholly detached therefrom, and integral with the head, said posts having at their free ends machine surfaces and having bolts projecting from said machined surfaces for the attachment of a wrist pin, and a wrist pin having correspondingly machined surfaces to cooperate with the machined surfaces of the posts, said wrist pin being apertured for mounting upon the bolts and being secured in place thereon.

In testimony whereof I affix my signature.

RAY N. STEELE.